(12) United States Patent
Woo et al.

(10) Patent No.: US 10,025,142 B2
(45) Date of Patent: Jul. 17, 2018

(54) DISPLAY DEVICE

(71) Applicant: Samsung Display Co., Ltd., Yongin, Gyeonggi-do (KR)

(72) Inventors: Su Wan Woo, Osan-si (KR); Un Byoll Ko, Yeoju-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 372 days.

(21) Appl. No.: 14/610,078

(22) Filed: Jan. 30, 2015

(65) Prior Publication Data

US 2016/0062188 A1 Mar. 3, 2016

(30) Foreign Application Priority Data

Sep. 3, 2014 (KR) ........................ 10-2014-0117018

(51) Int. Cl.
| | | |
|---|---|---|
| *G02F 1/1343* | (2006.01) | |
| *G02F 1/1337* | (2006.01) | |
| *G02F 1/1362* | (2006.01) | |

(52) U.S. Cl.
CPC .... *G02F 1/133707* (2013.01); *G02F 1/13624* (2013.01); *G02F 2001/134345* (2013.01)

(58) Field of Classification Search
None
See application file for complete search history.

(56) References Cited

U.S. PATENT DOCUMENTS

2015/0116625 A1* 4/2015 Hwang ............. G02F 1/136209
  349/57
2015/0323840 A1* 11/2015 Yang ................ G02F 1/134309
  349/139

FOREIGN PATENT DOCUMENTS

JP 2013-231794 11/2013
KR 10-2013-0093433 8/2013

* cited by examiner

*Primary Examiner* — Richard Kim
(74) *Attorney, Agent, or Firm* — H.C. Park & Associates, PLC

(57) ABSTRACT

A display device may include a first substrate, a second substrate opposite the first substrate, a liquid crystal layer between the first substrate and the second substrate, and a pixel electrode disposed on the first substrate and including a plurality of subpixel electrodes. The subpixel electrode may include a horizontal stem electrode, a plurality of vertical stem electrodes, and a plurality of branch electrodes extending from at least one of the horizontal stem electrode and the vertical stem electrodes.

8 Claims, 9 Drawing Sheets

DISPLAY DEVICE

CLAIM OF PRIORITY

This application claims priority from and all the benefit accruing under 35 U.S.C. § 119 of Korean Patent Application No. 10-2014-0117018, filed on Sep. 3, 2014 in the Korean Intellectual Property Office ("KIPO"), which is hereby incorporated by reference for all purposes as if fully set forth herein.

BACKGROUND OF THE INVENTION

1. Field of the Invention

Exemplary embodiments of the present invention relate to a display device with an improved transmittance and aperture ratio.

2. Description of the Related Art

A liquid crystal display, one of the most common types of flat panel display, typically includes two substrates on which electrodes, such as a pixel electrode and a common electrode, are disposed and a liquid crystal layer interposed between the two substrates. Liquid crystal molecules of the liquid crystal layer are rearranged upon applying an electric current to the electrodes, thereby adjusting the amount of transmitted light.

Among liquid crystal displays, a vertical alignment ("VA") mode liquid crystal display has been developed. In the VA mode, liquid crystal molecules are aligned so that a long axis of the molecules is vertical with respect to a substrate in a state where no electric field is applied. In the VA mode liquid crystal display, it is important to ensure improved visibility. For this purpose, a method of implementing a multi-domain has been suggested, the method in which one pixel is divided into a plurality of domains and liquid crystal molecules are tilted in different directions in each domain.

Meanwhile, studies on a curved display device having a predetermined radius of curvature have been increasingly conducted in accordance with consumer needs for display devices that maximize immersion.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding effective filing dates of subject matter disclosed herein.

SUMMARY OF THE INVENTION

One or more exemplary embodiment of the invention is directed toward a display device with an improved transmittance and aperture ratio.

According to an exemplary embodiment of the invention, a display device includes a first substrate, a second substrate opposite the first substrate, a liquid crystal layer between the first substrate and the second substrate, and a pixel electrode disposed on the first substrate and including a plurality of subpixel electrodes. The subpixel electrode may include a horizontal stem electrode, a plurality of vertical stem electrodes, and a plurality of branch electrodes extending from at least one of the horizontal stem electrode and the vertical stem electrodes.

The first and second substrates may have a predetermined radius of curvature.

The horizontal stem electrode may be disposed on a central portion of the subpixel electrode.

The vertical stem electrode may include a first vertical stem electrode and a second vertical stem electrode spaced apart from the first vertical stem electrode.

The display device may further include at least one substem electrode between the first and second vertical stem electrodes.

The substem electrode may be disposed parallel to the first and second vertical stem electrodes.

The substem electrode may be disposed parallel to the horizontal stem electrode.

The branch electrode may include a first branch electrode extending in an upper left direction from at least one of the horizontal stem electrode and the vertical stem electrodes, a second branch electrode extending in an upper right direction from at least one of the horizontal stem electrode and the vertical stem electrodes, a third branch electrode extending in a lower left direction from at least one of the horizontal stem electrode and the vertical stem electrodes, and a fourth branch electrode extending in a lower right direction from at least one of the horizontal stem electrode and the vertical stem electrodes.

The display device may further include a first alignment layer on the first substrate, a common electrode on the second substrate, and a second alignment layer on the second substrate.

At least one of the first alignment layer, the second alignment layer, and the liquid crystal layer may include a photopolymerizable material.

According to another exemplary embodiment of the invention, a display device includes a first substrate, a second substrate opposite the first substrate, a liquid crystal layer between the first and second substrates, and a pixel electrode disposed on the first substrate and including a plurality of subpixel electrodes. The subpixel electrode may include a horizontal stem electrode, a vertical stem electrode, and a plurality of branch electrodes extending from at least one of the horizontal stem electrode and the vertical stem electrode. At least one of the plurality of branch electrodes may extend from the vertical stem electrode in a direction parallel to the horizontal stem electrode and may be bent in a predetermined direction.

The first and second substrates may have a predetermined radius of curvature.

The horizontal and vertical stem electrodes may be disposed on a central portion of the subpixel electrode.

Another branch electrode of the plurality of branch electrodes may extend from the horizontal stem electrode in the predetermined direction.

The plurality of branch electrodes may include a first branch electrode extending in an upper left direction, a second branch electrode extending in an upper right direction, a third branch electrode extending in a lower left direction, and a fourth branch electrode extending in a lower right direction.

The display device may further include a first alignment layer on the first substrate, a common electrode on the second substrate, and a second alignment layer on the second substrate.

At least one of the first alignment layer, the second alignment layer, and the liquid crystal layer may include a photopolymerizable material.

According to one or more exemplary embodiment of the invention, a display device may have an improved transmittance and aperture ratio and also may effectively decrease a texture that occurs in a curved display device.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION OF THE INVENTION

Figure 1:
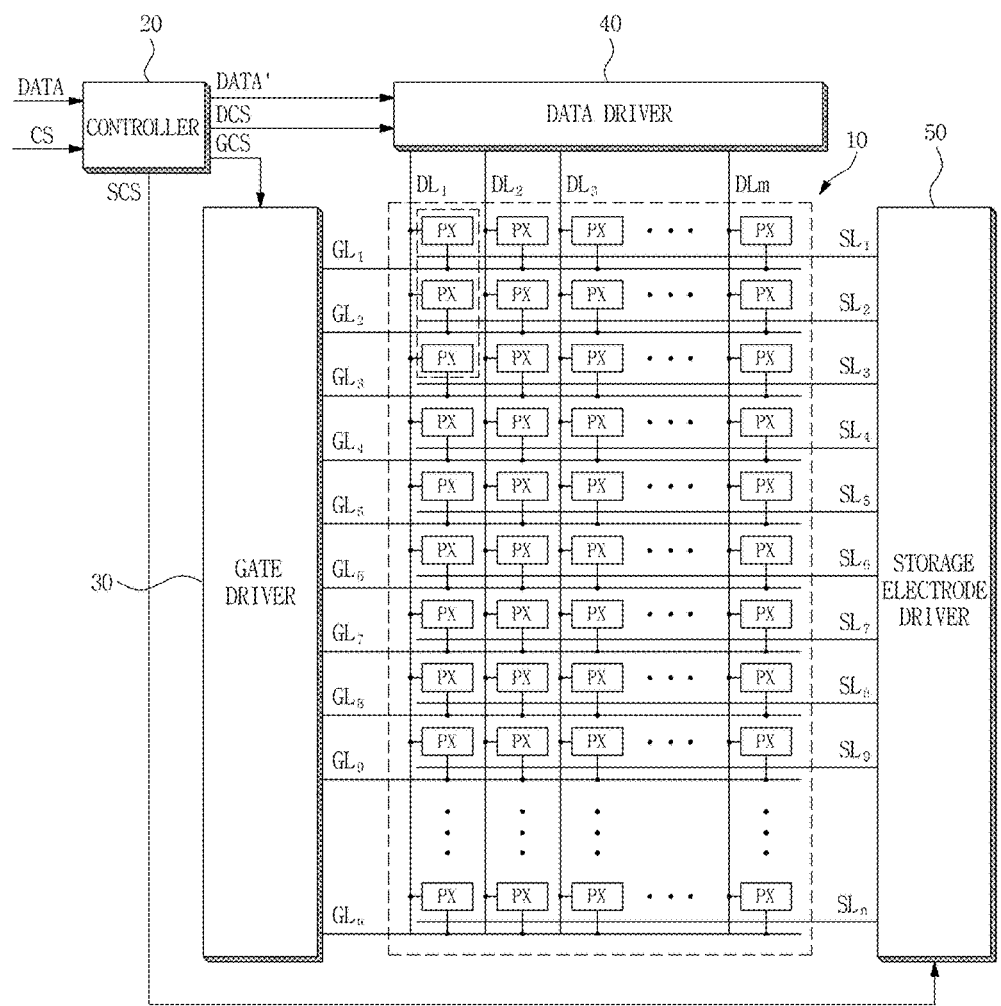
FIG. 1 is a schematic block diagram illustrating an exemplary embodiment of a display device according to the invention.

Advantages and features of the present invention and methods for achieving them will be made clear from embodiments described below in detail with reference to the accompanying drawings. The present invention may, however, be embodied in many different forms and should not be construed as limited to the embodiments set forth herein. Rather, these embodiments are provided so that this disclosure will be thorough and complete, and will fully convey the scope of the invention to those skilled in the art. This invention will be defined only by the scope of the claims. Therefore, well-known constituent elements, operations and techniques are not described in detail in the embodiments, to prevent the present invention from being obscurely interpreted. Like reference numerals refer to like elements throughout the specification.

Spatially relative terms, such as "below," "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "lower" relative to other elements or features would then be oriented "above" or "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used in this specification is merely used to describe embodiments of the present invention and is not intended to limit the invention. An expression used in the singular encompasses the expression of the plural unless it has a clearly different meaning in the context. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Unless otherwise defined, all terms including technical and scientific terms used herein have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present application.

Referring to FIG. 1, a display device according to an exemplary embodiment of the invention includes a display panel 10 including a plurality of pixels PXs, a controller 20 configured to process an image signal DATA and a control signal CS, which are externally received, so as to output many different signals, a gate driver 30 configured to supply a gate signal to gate lines ($GL_1$~$GL_n$) connected to the pixels PXs, a data driver 40 configured to supply a data signal to data lines ($DL_1$~$DL_m$) connected to the pixels PXs, and a storage electrode driver 50 configured to supply a storage electrode signal to storage electrode lines SL1~SLn.

The display panel 10 may include a plurality of gate lines ($GL_1$~$GL_n$) configured to transmit a gate signal in a row direction, a plurality of data lines ($DL_1$~$DL_m$) configured to transmit a data signal in a column direction, and a plurality of pixels PXs arranged in a matrix form in a region where the gate lines and the data lines intersect (or cross) each other.

The controller 20 may provide the gate driver 30 with a gate control signal GCS and also provide the data driver 40 with a data control signal DCS based on the externally received control signal CS. Further, the controller 20 may output a processed image signal DATA' to the data driver 40 based on the externally received image signal DATA.

For instance, the control signal CS may be a timing signal such as vertical synchronization (VSYNC), horizontal synchronization (HSYNC), clock (CLK), and data enable (DE) signals, and the image signal DATA may be a digital signal that represents a gray level of the pixels PXs.

The gate driver 30 may receive the gate control signal GCS from the controller 20 so as to generate the gate signal and may supply the gate signal to the pixels PXs connected to each of the plurality of gate lines ($GL_1$~$GL_n$). The gate signal may be sequentially input to the pixels PXs so that the data signal may also be sequentially supplied to the pixels PXs.

The data driver 40 may receive the data control signal DCS and the processed image signal DATA' from the controller 20 and may supply the data signal corresponding to the processed image signal DATA' to the pixels PXs connected to each of the plurality of data lines ($DL_1$~$DL_m$) in response to the data control signal DCS. The data signal may also be represented by a data voltage.

The storage electrode driver 50 is configured to receive the storage electrode control signal from the controller 20 to generate the storage electrode signal, and supply the storage electrode signal to the plurality of storage electrode lines SL1~SLn. The storage electrode signal may be expressed as a storage voltage.

Figure 2:
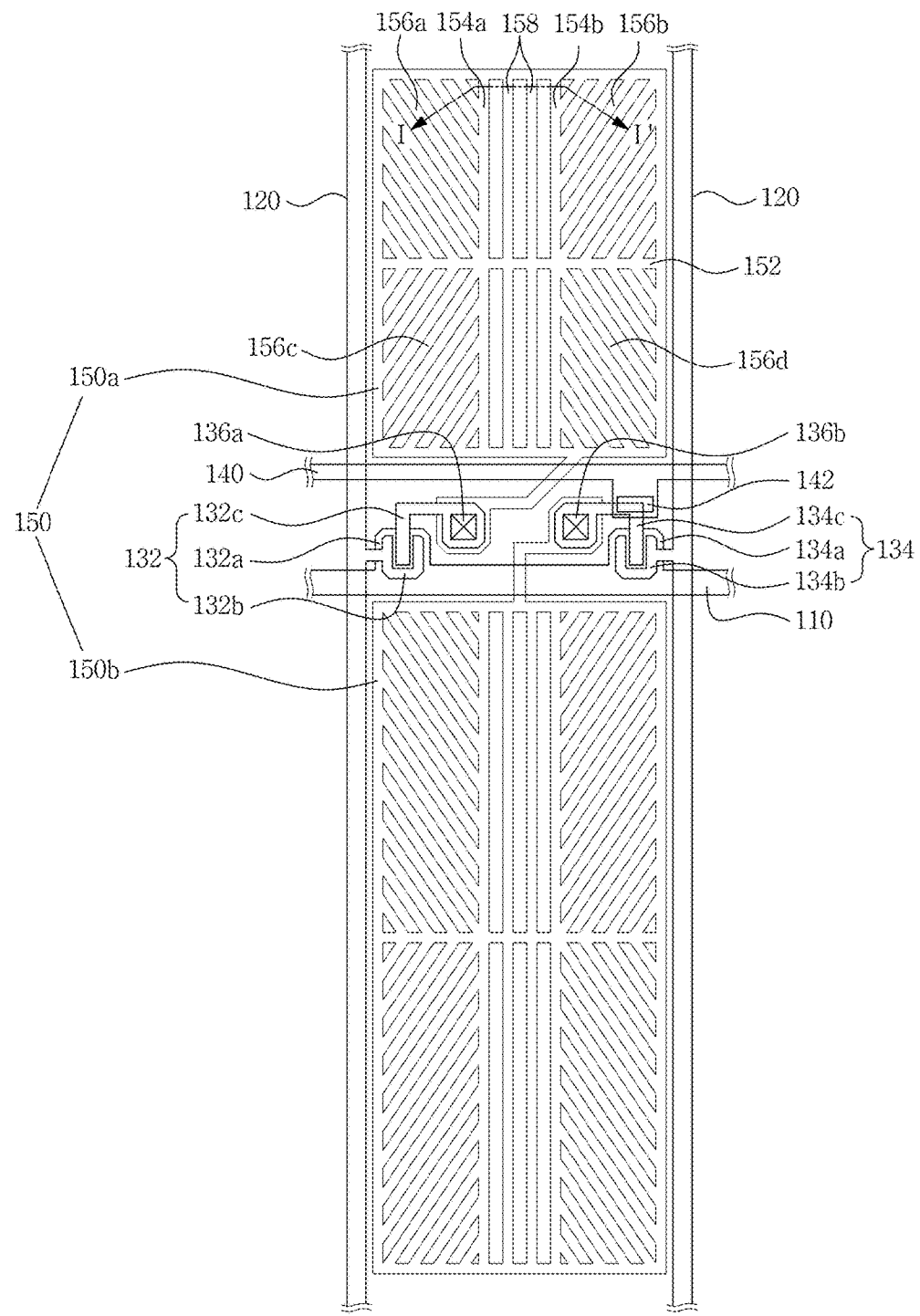
FIG. 2 is a plan view illustrating an exemplary embodiment of a pixel of a display device according to the invention.
Figure 3:
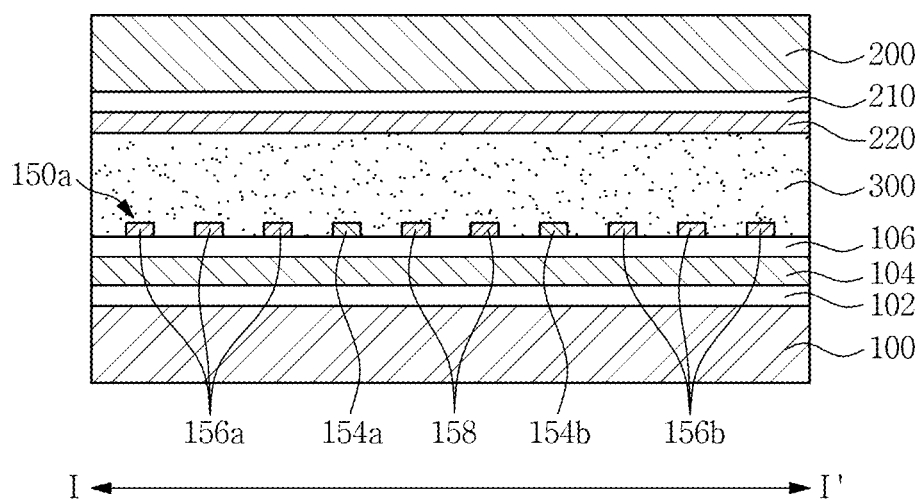
FIG. 3 is a cross-sectional view taken along line I-I' of FIG. 2.

Referring to FIGS. 2 and 3, the display device according to an exemplary embodiment of the invention includes a first substrate 100, a second substrate 200 opposite the first substrate 100, and a liquid crystal layer 300 between the first and second substrates 100 and 200.

The first substrate 100 may include a transparent material, such as glass or transparent plastic, and may be a flat type (FIG. 5a) or a curved type (FIG. 5b) that has a predetermined radius of curvature, but is not limited thereto.

A plurality of gate lines 110 may be disposed on the first substrate 100 to be spaced apart from each other in a substantially horizontal direction. The gate line 110 may include an aluminum-based metal such as aluminum (Al) or aluminum alloy, a silver-based metal such as silver (Ag) or silver alloy, a copper-based metal such as copper (Cu) or copper alloy, a molybdenum-based metal such as molybdenum (Mo) or molybdenum alloy, chromium (Cr), tantalum (Ta), titanium (Ti), or the like. The gate line 110 may have a multilayer structure in a cross-sectional thickness direction in which two or more conductive layers having different physical or chemical properties are laminated.

A plurality of data lines 120 may be spaced apart from each other in a substantially vertical direction such as to be intersect (or cross) the gate lines 110. The data line 120 may include a refractory metal such as molybdenum (Mo), chromium (Cr), tantalum (Ta), and titanium (Ti) or alloys thereof, or may have a multilayer structure in a cross-sectional thickness direction and including a refractory metal layer and a low resistance conductive layer.

A first thin film transistor ("TFT") 132 may include a first gate electrode 132a connected to the gate line 110, a first source electrode 132b connected to the data line 120, and a first drain electrode 132c connected to a first subpixel electrode 150a through a first contact opening (e.g., hole) 136a.

A second TFT 134 may include a second gate electrode 134a connected to the gate line 110, a second source electrode 134b connected to the data line 120, and a second drain electrode 134c connected to a second subpixel electrode 150b through a second contact opening (e.g., hole) 136b.

Although not illustrated, the gate electrodes 132a and 134a may be insulated from the source electrodes 132b and 134b and the drain electrodes 132c and 134c by a gate insulating layer 102. A semiconductive layer (not shown) may be disposed between the source and drain electrodes 132b and 134b, and 132c and 134c and the gate insulating layer 102.

A color filter 104 and a protective layer 106 may be sequentially disposed on the gate insulating layer 102 and the semiconductive layer, but the invention is not limited thereto. The color filter 104 may be disposed on the second substrate 200 (not shown).

The color filter 104 may display one of three primary colors, i.e., red, green, and blue. However, the color filter 104 is not limited to the three primary colors and may display one of cyan, magenta, yellow, and white-based colors.

The protective layer 106 may include an inorganic insulating material such as silicon nitride and silicon oxide or an organic insulating material, but is not limited thereto.

A storage electrode line 140 may be disposed parallel to the gate line 110 and may include a storage electrode 142 that extends downwards. The storage electrode 142 may be applied with a storage voltage Vcst through the storage electrode line 140.

A pixel electrode 150 may be disposed on the protective layer 106 and may include a transparent conductive material.

The pixel electrode 150 may include the first subpixel electrode 150a and the second subpixel electrode 150b. The first and second subpixel electrodes 150a and 150b may be disposed on (or above) or under the gate line 110 and may be adjacent to each other in a column direction. Voltages applied to the first and second subpixel electrodes 150a and 150b may be different from each other.

In FIG. 3, a first alignment layer (not shown) may be disposed on the pixel electrode 150. The first alignment layer may be a vertical alignment layer or a photo-alignment layer including a photopolymer material. The photopolymer material may include a reactive monomer or a reactive mesogen.

The second substrate 200 may include a transparent material, such as glass or transparent plastic, and may be a flat type (FIG. 5a) or a curved type (FIG. 5b) that has a longer radius of curvature than that of the first substrate 100, but is not limited thereto.

A planarization layer 210 and a common electrode 220 may be sequentially disposed on the second substrate 200. The planarization layer 210 may include an organic material and the common electrode 220 may include a transparent conductive material.

The gate line 110, the data line 120, and a black matrix (not shown) configured to reduce or effectively prevent light leakage along the TFTs 132 and 134 may be disposed under the planarization layer 210. However, the black matrix may be disposed on the first substrate 100.

A second alignment layer (not shown) may be disposed under the common electrode 220. The second alignment layer may be a vertical alignment layer or a photo-alignment layer including a photopolymer material. The photopolymer material may include a reactive monomer or a reactive mesogen.

Configurations of the first and second subpixel electrodes 150a and 150b will be described below with reference to FIG. 4.

Figure 4:
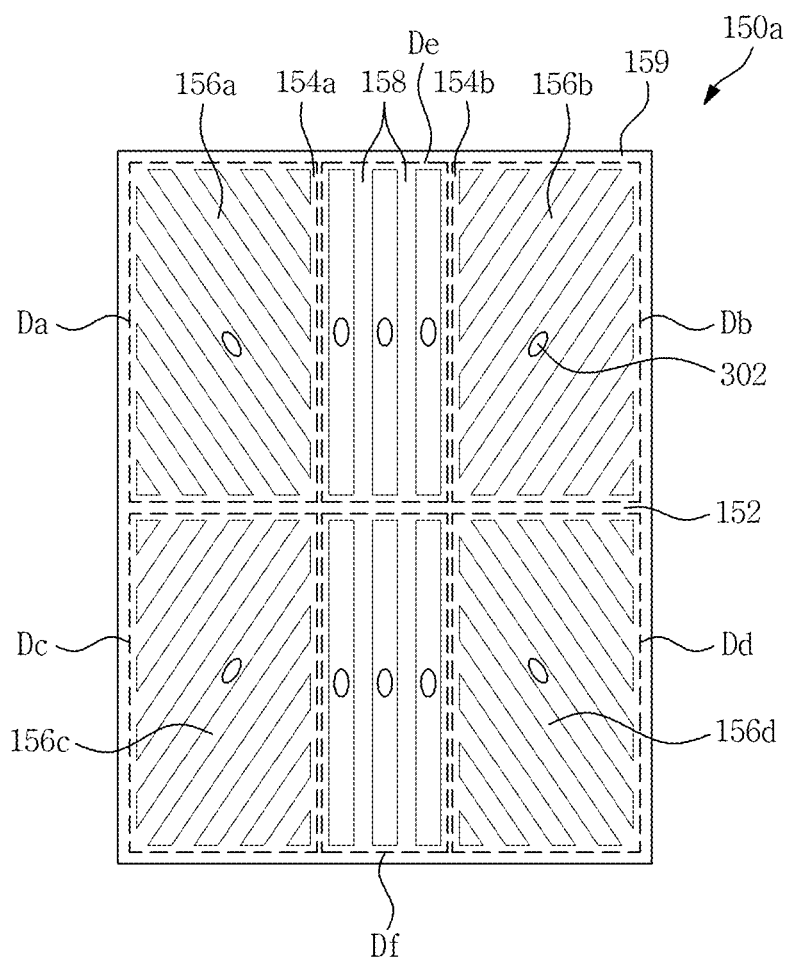
FIG. 4 is a diagram illustrating a fundamental configuration of a first subpixel electrode shown in FIG. 2.

Referring to FIG. 4, the first subpixel electrode 150a may include a horizontal stem electrode 152, first and second vertical stem electrodes 154a and 154b, and first to fourth branch electrodes 156a, 156b, 156c, and 156d.

The horizontal stem electrode 152 may be disposed parallel to the gate line 110 and may be desirably disposed on a central portion of the subpixel electrodes 150a and 150b.

The first and second vertical stem electrodes 154a and 154b may be disposed parallel to the data line 120 and may be orthogonal to the horizontal stem electrode 152.

The first vertical stem electrode 154a may be spaced apart from the second vertical stem electrode 154b and at least one substem electrode 158 may be disposed between the first and second vertical stem electrodes 154a and 154b.

The first branch electrode 156a may extend from at least one of the horizontal stem electrode 152 and the first vertical stem electrode 154a in an upper left direction. The second branch electrode 156b may extend from at least one of the horizontal stem electrode 152 and the second vertical stem electrode 154b in an upper right direction. The third branch electrode 156c may extend from at least one of the horizontal stem electrode 152 and the first vertical stem electrode 154a in a lower left direction. The fourth branch electrode 156d may extend from at least one of the horizontal stem electrode 152 and the second vertical stem electrode 154b in a lower right direction.

The first to fourth branch electrodes 156a, 156b, 156c, and 156d may desirably have the same width, but are not limited thereto. The first to fourth branch electrodes 156a, 156b, 156c, and 156d may have different widths from each other.

The substem electrode 158 may be disposed parallel to the first and second vertical stem electrodes 154a and 154b.

The first subpixel electrode 150a may further include an outer stem electrode 159 that surrounds outsides of the horizontal stem electrode 152, the plurality of vertical stem electrodes 154a and 154b, and the plurality of branch electrodes 156a, 156b, 156c, and 156d. A longitudinal portion of the outer stem electrode 159 may extend in a direction parallel to the data line 120 such as to reduce or effectively prevent capacitive coupling between the data line 120 and the first subpixel electrode 150a.

The first subpixel electrode 150a may be partitioned into a first subarea Da, a second subarea Db, a third subarea Dc, a fourth subarea Dd, a fifth subarea De, and a sixth subarea Df by the horizontal stem electrode 152 and the first and second vertical stem electrodes 154a and 154b. The first to fourth subareas Da, Db, Dc, and Dd may include the first to fourth branch electrodes 156a, 156b, 156c, and 156d, respectively. Each of the fifth and sixth subareas De and Df may include at least one substem electrode 158.

The first subpixel electrode 150a may receive a data voltage from the first drain electrode 132c through the first contact opening (e.g., hole) 136a, and an electric field may be generated by the data voltage in conjunction with a common voltage applied to the common electrode 220 such that an orientation of liquid crystal molecules 302 may be determined. The orientation of the liquid crystal molecules 302 may determine luminance of light transmitted through the liquid crystal layer 300.

Sides of the first to fourth branch electrodes 156a, 156b, 156c, and 156d and the substem electrode 158 may cause electric field distortions so as to provide horizontal components of the electric field that determines a tilt direction of the liquid crystal molecules 302. The horizontal components of the electric field may be substantially horizontal with respect to the sides of the first to fourth branch electrodes 156a, 156b, 156c, and 156d and the substem electrode 158. Accordingly, the liquid crystal molecules 302 may be arranged in six different directions in the six subareas Da to Df of the first subpixel electrode 150a.

The second subpixel electrode 150b may be disposed in the same manner as the first subpixel electrode 150a, and thus detailed descriptions of the second subpixel electrode 150b will be omitted. However, the second subpixel electrode 150b may be different from the first subpixel electrode 150a in size, and the scope of the invention is not limited by the size of the first and second subpixel electrodes 150a and 150b.

Figure 5:
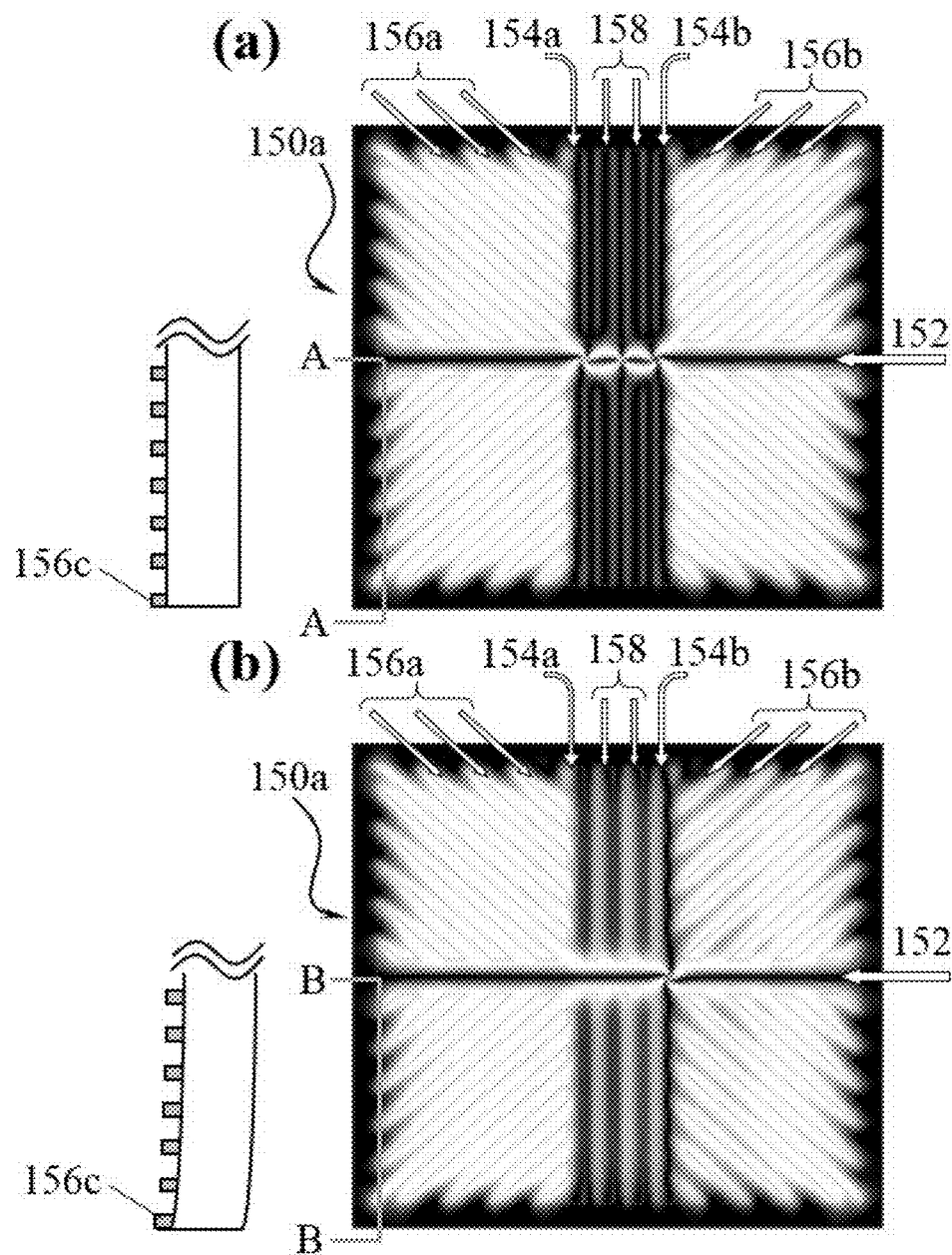
FIG. 5 provides photographs of results of experiments conducted using a display device illustrated in FIG. 2.

Section (a) of FIG. 5 is a photograph of a result of an experiment conducted using a display device with no radius of curvature. A smaller figure by the left side of the display device shows a cross-section along A-A. Section (b) of FIG. 5 is a photograph of a result of an experiment conducted using a display device with a radius of curvature of 4000 R. A smaller figure by the left side of the display device shows a cross-section along B-B with curvature of substrate.

Referring to FIG. 5, although the display device according to an exemplary embodiment of the invention has a radius of curvature, it may exhibit a transmittance and aperture ratio which are at the same level as the display device with no radius of curvature, and also it may show a decreased texture.

Figure 6:
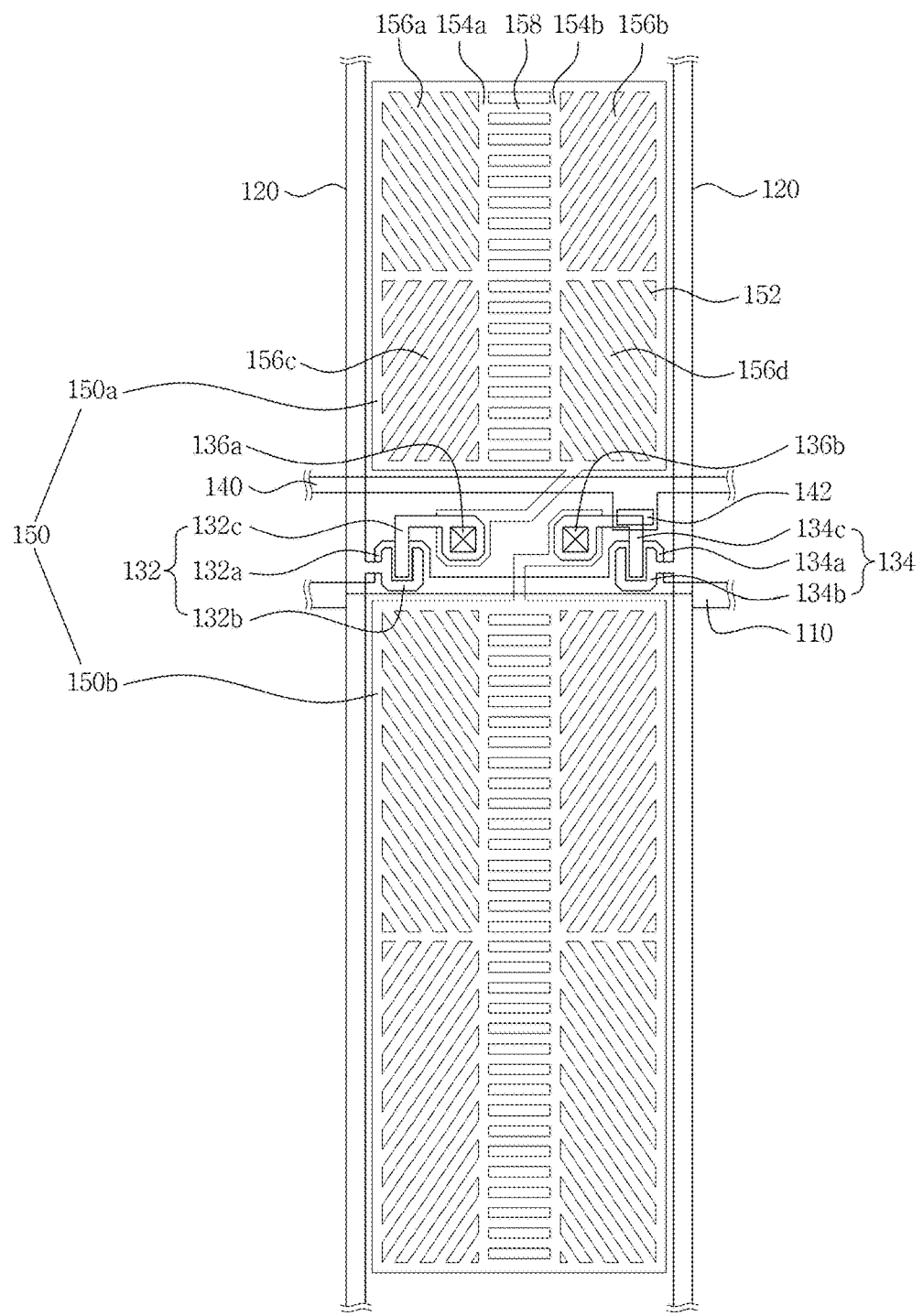
FIG. 6 is a plan view illustrating another exemplary embodiment of a pixel of a display device according to the invention.
Figure 7:
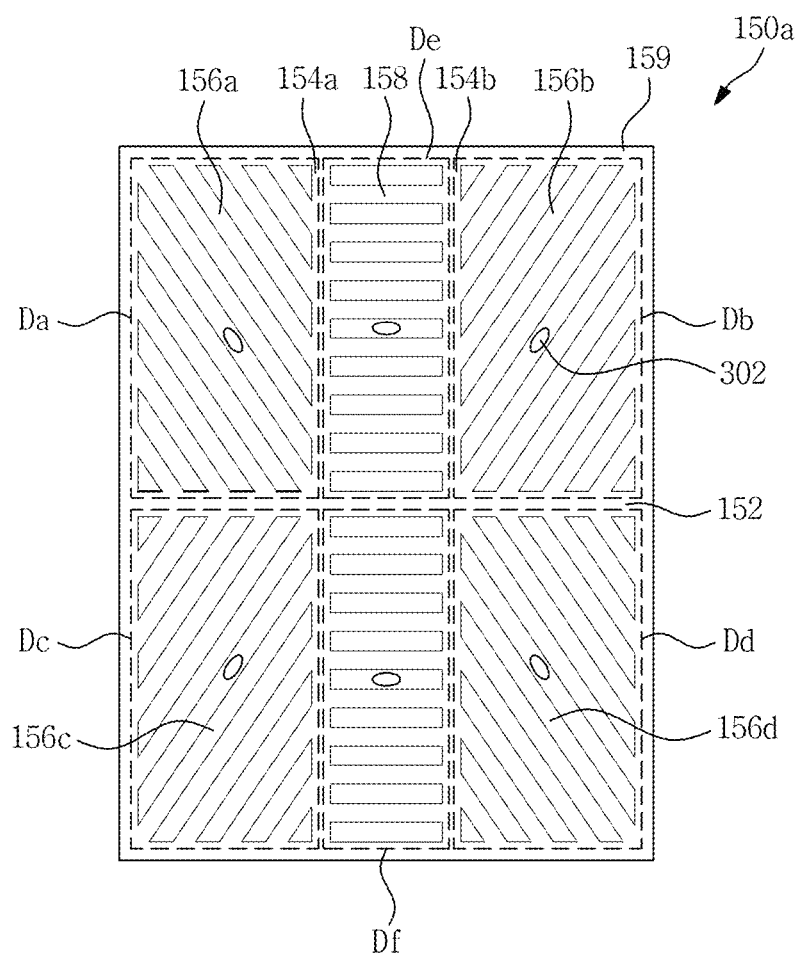
FIG. 7 is a diagram illustrating a fundamental configuration of a first subpixel electrode shown in FIG. 6.

Referring to FIGS. 6 and 7, a display device according to another exemplary embodiment of the invention has the same configuration as the display device illustrated in FIG. 2, except for the arrangement of the substem electrode 158. Descriptions of the same configuration will be omitted for the sake of brevity.

The substem electrode 158 may be disposed between the first and second vertical stem electrodes 154a and 154b and also may be disposed parallel to the horizontal stem electrode 152 unlike the display device illustrated in FIG. 2. In this case, the liquid crystal molecules 302 may be arranged parallel to the horizontal stem electrode 152 between the substem electrodes 158 unlike the display device illustrated in FIG. 2.

Therefore, the liquid crystal molecules 302 may be arranged in six different directions in the six subareas Da to Df of the first subpixel electrode 150a.

Figure 8:
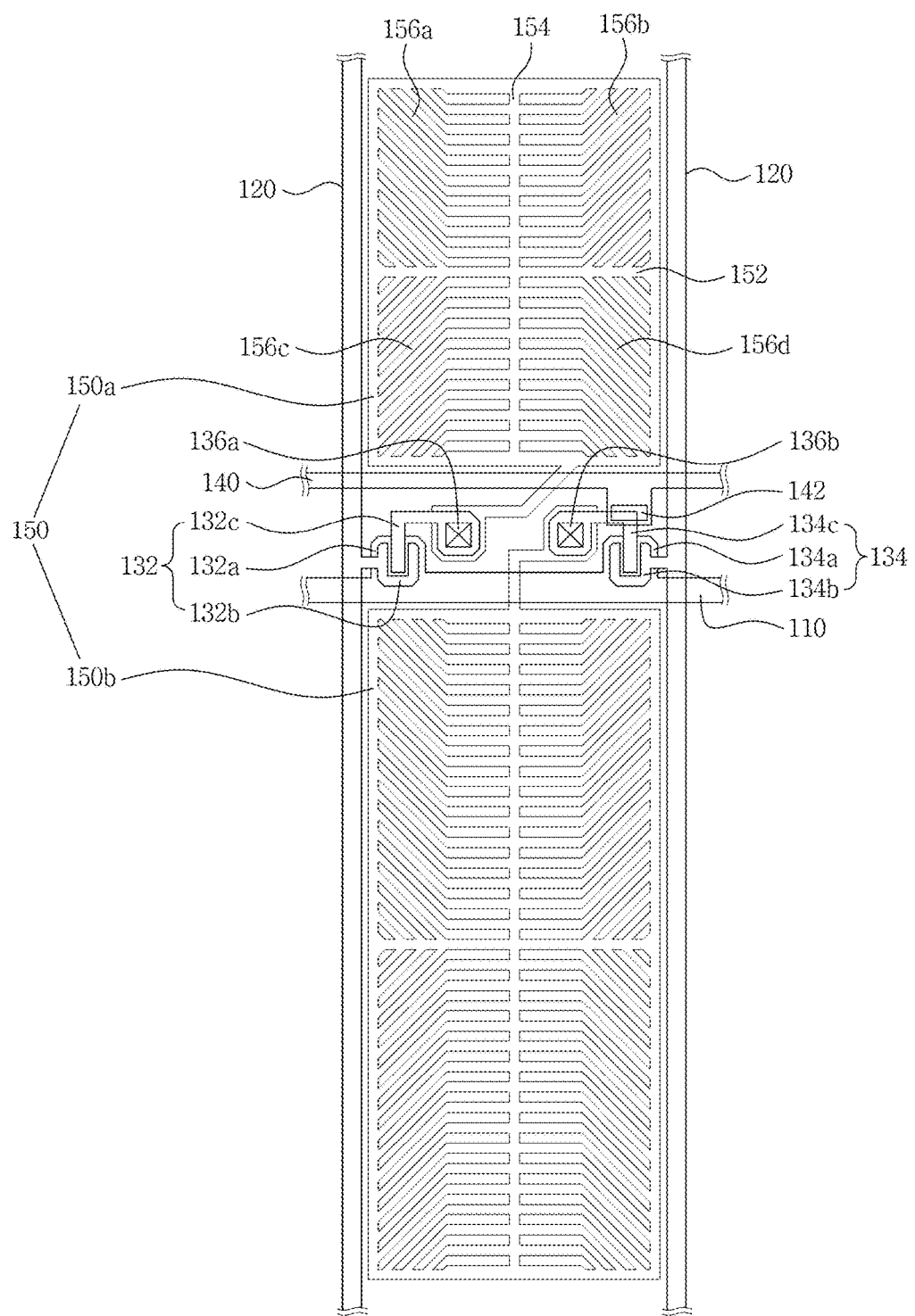
FIG. 8 is a plan view illustrating yet another exemplary embodiment of a pixel of a display device according to the invention.
Figure 9:
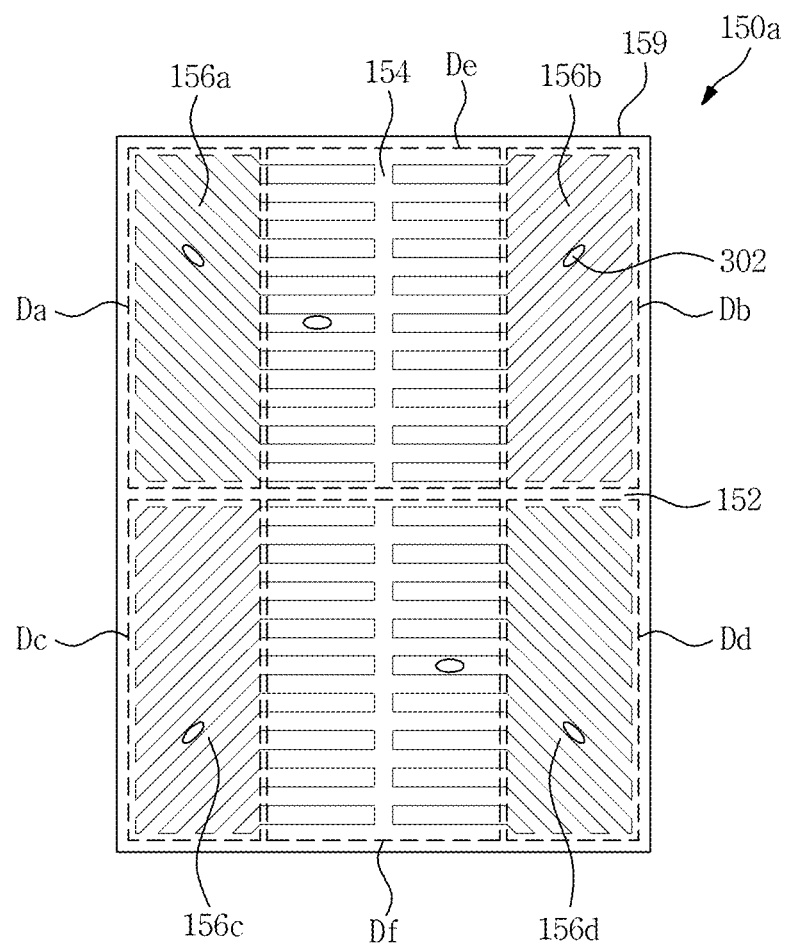
FIG. 9 is a diagram illustrating a fundamental configuration of a first subpixel electrode shown in FIG. 8.

Referring to FIGS. 8 and 9, a display device according to yet another exemplary embodiment of the invention has the same configuration as the display device illustrated in FIG. 2, except for the arrangement of the subpixel electrode. Descriptions of the same configuration will be omitted for the sake of brevity.

The first and second subpixel electrodes 150a and 150b may include the horizontal stem electrode 152, the vertical stem electrode 154, and the first to fourth branch electrodes 156a, 156b, 156c, and 156d.

Any one of the first branch electrodes 156a may extend from the vertical stem electrode 154 in a direction parallel to the horizontal stem electrode 152 and may be bent in an upper left direction. Another first branch electrode 156a may extend from the horizontal stem electrode 152 in an upper left direction.

Any one of the second branch electrodes 156b may extend from the vertical stem electrode 154 in a direction parallel to the horizontal stem electrode 152 and may be bent in an upper right direction. Another second branch electrode 156b may extend from the horizontal stem electrode 152 in an upper right direction.

Any one of the third branch electrodes 156c may extend from the vertical stem electrode 154 in a direction parallel to the horizontal stem electrode 152 and may be bent in a lower left direction. Another third branch electrode 156c may extend from the horizontal stem electrode 152 in a lower left direction.

Any one of the fourth branch electrodes 156d may extend from the vertical stem electrode 154 in a direction parallel to the horizontal stem electrode 152 and may be bent in a lower right direction. Another fourth branch electrode 156d may extend from the horizontal stem electrode 152 in a lower right direction.

Sides of the first to fourth branch electrodes 156a, 156b, 156c, and 156d may cause electric field distortions so as to provide horizontal components of the electric field that determines a tilt direction of the liquid crystal molecules 302. The horizontal components of the electric field may be substantially horizontal with respect to the sides of the first to fourth branch electrodes 156a, 156b, 156c, and 156d. Accordingly, the liquid crystal molecules 302 may be arranged in six different directions in the six subareas Da to Df of the first subpixel electrode 150a.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims, and equivalents thereof.

What is claimed is:

1. A display device, comprising:
   a first substrate;
   a data line disposed on the first substrate;
   a second substrate opposite the first substrate;
   a liquid crystal layer between the first substrate and the second substrate; and
   a pixel electrode on the first substrate, the pixel electrode comprising a plurality of subpixel electrodes, wherein each subpixel electrode comprises:
   a horizontal stem electrode;
   a plurality of vertical stem electrodes;
   a plurality of branch electrodes extending from at least one of the horizontal stem electrode and the vertical stem electrodes; and
   wherein the plurality of vertical stem electrodes defines at least one slit parallel to the data line.

2. The display device of claim 1, wherein the first and second substrates have a predetermined radius of curvature.

3. The display device of claim 1, wherein the horizontal stem electrode is disposed on a horizontally central portion of the subpixel electrode.

4. The display device of claim 1, wherein the plurality of vertical stem electrodes comprises:
   a first vertical stem electrode; and
   a second vertical stem electrode spaced apart from the first vertical stem electrode.

5. The display device of claim 4, further comprising at least one substem electrode between the first and second vertical stem electrodes.

6. The display device of claim 5, wherein the substem electrode is disposed parallel to the first and second vertical stem electrodes.

7. The display device of claim 1, wherein the branch electrode comprises:
   a first branch electrode extending in an upper left direction from at least one of the horizontal stem electrode and the vertical stem electrodes;
   a second branch electrode extending in an upper right direction from at least one of the horizontal stem electrode and the vertical stem electrodes;
   a third branch electrode extending in a lower left direction from at least one of the horizontal stem electrode and the vertical stem electrodes; and
   a fourth branch electrode extending in a lower right direction from at least one of the horizontal stem electrode and the vertical stem electrodes.

8. The display device of claim 1, further comprising:
   a first alignment layer on the first substrate;
   a common electrode on the second substrate; and
   a second alignment layer on the second substrate, wherein at least one of the first alignment layer, the second alignment layer, and the liquid crystal layer comprises a photopolymerizable material.

* * * * *